(12) United States Patent
Saeedi et al.

(10) Patent No.: US 8,817,379 B2
(45) Date of Patent: Aug. 26, 2014

(54) WHOLE IMAGE SCANNING MIRROR DISPLAY SYSTEM

(75) Inventors: Ehsan Saeedi, Santa Clara, CA (US); Xiaoyu Miao, Sunnyvale, CA (US); Babak Amirparviz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 346 days.

(21) Appl. No.: 13/181,275

(22) Filed: Jul. 12, 2011

(65) Prior Publication Data

US 2013/0016413 A1    Jan. 17, 2013

(51) Int. Cl.
*G02B 27/14* (2006.01)
*G02B 27/01* (2006.01)
*G02B 26/10* (2006.01)

(52) U.S. Cl.
CPC .............. *G02B 27/01* (2013.01); *G02B 26/101* (2013.01)
USPC ....................................... 359/630; 359/201.1

(58) Field of Classification Search
USPC .......... 359/198.1–199.4, 200.6–200.8, 202.1, 359/221.2, 223.1–225.1, 226.2, 904, 359/290–295, 630, 632, 633, 13, 838, 846, 359/871, 872; 250/204, 559.06, 559.29, 250/230, 234; 347/255–260; 353/39, 353/98–99; 385/15–18, 22; 398/12, 19, 45
See application file for complete search history.

(56) References Cited

U.S. PATENT DOCUMENTS

| | | |
|---|---|---|
| 4,806,011 A | 2/1989 | Bettinger |
| 5,093,567 A | 3/1992 | Staveley |
| 5,334,991 A | 8/1994 | Wells et al. |
| 5,539,422 A | 7/1996 | Heacock et al. |
| 5,696,521 A | 12/1997 | Robinson et al. |
| 5,715,337 A | 2/1998 | Spitzer et al. |
| 5,771,124 A | 6/1998 | Kintz et al. |

(Continued)

FOREIGN PATENT DOCUMENTS

| | | |
|---|---|---|
| GB | 2272980 A | 6/1994 |
| KR | 10-2011-0065375 A | 6/2011 |
| WO | WO96/05533 A1 | 2/1996 |
| WO | WO 01/33282 A1 | 5/2001 |

OTHER PUBLICATIONS

Kasai, I., Tanijiri, Y., Endo, T., and Ueda, H., "A Forgettable Near Eye Display," Optics Technology Division, Minolta Co., Ltd.; The Fourth International Symposium on Wearable Computers, 2000, pp. 115-118.

(Continued)

*Primary Examiner* — Jennifer L. Doak
(74) *Attorney, Agent, or Firm* — Blakely Sokoloff Taylor & Zafman LLP (57) ABSTRACT

An optical apparatus includes an image source, a scanning mirror, an actuator, and a scanning controller. The image source outputs an image by simultaneously projecting a two-dimensional array of image pixels representing a whole portion of the image. The scanning mirror is positioned in an optical path of the image to reflect the image. The actuator is coupled to the scanning mirror to selectively adjust the scanning mirror about at least one axis. The scanning controller is coupled to the actuator to control a position of the scanning mirror about the at least one axis. The scanning controller includes logic to continuously and repetitiously adjust the position of the scanning mirror to cause the image to be scanned over an eyebox area that is larger than the whole portion of the image.

21 Claims, 8 Drawing Sheets

(56) References Cited

U.S. PATENT DOCUMENTS

| | | |
|---|---|---|
| 5,815,126 A | 9/1998 | Fan et al. |
| 5,844,530 A | 12/1998 | Tosaki |
| 5,886,822 A | 3/1999 | Spitzer |
| 5,896,232 A | 4/1999 | Budd et al. |
| 5,943,171 A | 8/1999 | Budd et al. |
| 5,949,583 A | 9/1999 | Rallison et al. |
| 6,023,372 A | 2/2000 | Spitzer et al. |
| 6,081,304 A | 6/2000 | Kuriyama et al. |
| 6,091,546 A | 7/2000 | Spitzer |
| 6,172,657 B1 | 1/2001 | Kamakura et al. |
| 6,201,629 B1 | 3/2001 | McClelland et al. |
| 6,204,974 B1 | 3/2001 | Spitzer |
| 6,222,677 B1 | 4/2001 | Budd et al. |
| 6,349,001 B1 | 2/2002 | Spitzer |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,538,799 B2 | 3/2003 | McClelland et al. |
| 6,618,099 B1 | 9/2003 | Spitzer |
| 6,690,516 B2 | 2/2004 | Aritake et al. |
| 6,701,038 B2 | 3/2004 | Rensing et al. |
| 6,723,354 B1 | 4/2004 | Spitzer |
| 6,724,354 B1 | 4/2004 | Spitzer et al. |
| 6,738,535 B2 | 5/2004 | Kanevsky et al. |
| 6,747,611 B1 | 6/2004 | Budd et al. |
| 6,829,095 B2 | 12/2004 | Amitai |
| 6,879,443 B2 | 4/2005 | Spitzer et al. |
| 7,158,096 B1 | 1/2007 | Spitzer |
| 7,242,527 B2 | 7/2007 | Spitzer et al. |
| 7,391,573 B2 | 6/2008 | Amitai |
| 7,457,040 B2 | 11/2008 | Amitai |
| 7,576,916 B2 | 8/2009 | Amitai |
| 7,577,326 B2 | 8/2009 | Amitai |
| 7,637,617 B2 | 12/2009 | Liu et al. |
| 7,643,214 B2 | 1/2010 | Amitai |
| 7,663,805 B2 | 2/2010 | Zaloum et al. |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitari |
| 7,830,607 B2 | 11/2010 | Hotta et al. |
| 7,843,403 B2 | 11/2010 | Spitzer |
| 7,900,068 B2 | 3/2011 | Weststrate et al. |
| 8,004,765 B2 | 8/2011 | Amitai |
| 2001/0048554 A1 | 12/2001 | Yona et al. |
| 2002/0097498 A1* | 7/2002 | Melville et al. ............... 359/630 |
| 2003/0090439 A1 | 5/2003 | Spitzer et al. |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2008/0219025 A1 | 9/2008 | Spitzer et al. |
| 2009/0122414 A1 | 5/2009 | Amitari |
| 2010/0046070 A1 | 2/2010 | Mukawa |
| 2010/0103078 A1 | 4/2010 | Mukawa et al. |
| 2010/0149073 A1 | 6/2010 | Chaum et al. |
| 2010/0278480 A1 | 11/2010 | Vasylyev et al. |
| 2011/0213664 A1 | 9/2011 | Osterhout et al. |

OTHER PUBLICATIONS

Cakmakci, O. and Rolland, J., "Head-Worn Displays: A Review," Journal of Display Technology, vol. 2, No. 3, Sep. 2006, pp. 199-216.

Levola, Tapani, "Diffractive Optics for Virtual Reality Displays", Academic Dissertation, Joensuu 2005, University of Joensuu, Department of Physics, Vaisala Laboratory, 26 pages.

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

Microvision Color Eyewear Program Brief, Microvision, Inc., http://www.microvision.com/pdfs/program_brief.pdf <retrieved from Internet May 12, 2011>, 2 pages.

Microvision Technology: PicoP Display Engine, Microvision, Inc., http://www.microvision.com/technology/picop.html <retrieved from Internet May 12, 2011>, 1 page.

Microvision Technology: MEMS Scanning Mirror, Microvision, Inc., http://www.microvision.com/technology/mems.html <retrieved from Internet May 12, 2011>, 1 page.

Microvision Bar Code Scanners: MEMS Technology Overview, Microvision, Inc., http://www.microvision.com/barcode/mems_scanner.html <retrieved from Internet May 12, 2011>, 2 pages.

PCT/US2012/041153; PCT International Search Report and Written Opinion of the International Searching Authority, mailed Jan. 31, 2013, 11 pages.

PCT/US2012/041153; PCT International Preliminary Report on Patentability, mailed Jan. 23, 2014, 8 pages.

* cited by examiner

HORIZONTAL SCANNING

FIG. 3A

HORIZONTAL AND VERTICAL SCANNING

WHOLE IMAGE SCANNING MIRROR DISPLAY SYSTEM

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to display an image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD is often referred to as augmented reality because the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are currently limited due to the cost, size, field of view, eye box, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and technique for extending an eyebox of an image display apparatus using whole image scanning are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
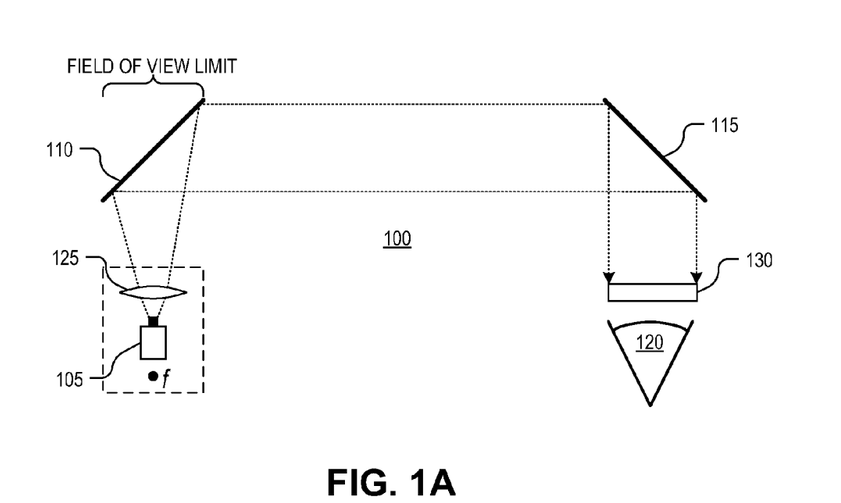
FIG. 1A illustrates a near-to-eye optical system using an input lens and two mirrors.

FIG. 1A illustrates a near-to-eye optical system 100 using an input lens and two mirrors. An image source 105 outputs an image that is reflected by two mirrors 110 and 115, which form an image near to eye 120. Image source 105 is typically mounted above the head or to the side of the head, while mirrors 110 and 115 bend the image around the front of the viewer's face to their eye 120. Since the human eye is typically incapable of focusing on objects placed within a few centimeters, this system uses a lens 125 interposed between the first mirror 110 and image source 105. Lens 125 creates a virtual image that is displaced further back from the eye than the actual location of mirror 115 by positioning image source 105 inside of the focal point f of lens 125. Optical system 100 suffers from a relatively small field of view (e.g., approximately 20 degrees) limited by the extent of mirrors 110 and 115 and the bulkiness of lens 125. The field of view can be marginally improved by placing mirrors 110 and 115 within a high index material to compress the angles of incidence, but is still very limited and the thickness of the waveguide rapidly increases to achieve larger fields of view. Optical system 100 also suffers from a relatively small eyebox 130. The eyebox is the region from which eye 120 can view the image. If eye 120 moves outside of eyebox 130, then the image disappears. An overly small eyebox can significantly degrade the user experience, since small shifts in the optical apparatus during use can cause the image to disappear.

Figure 1B:
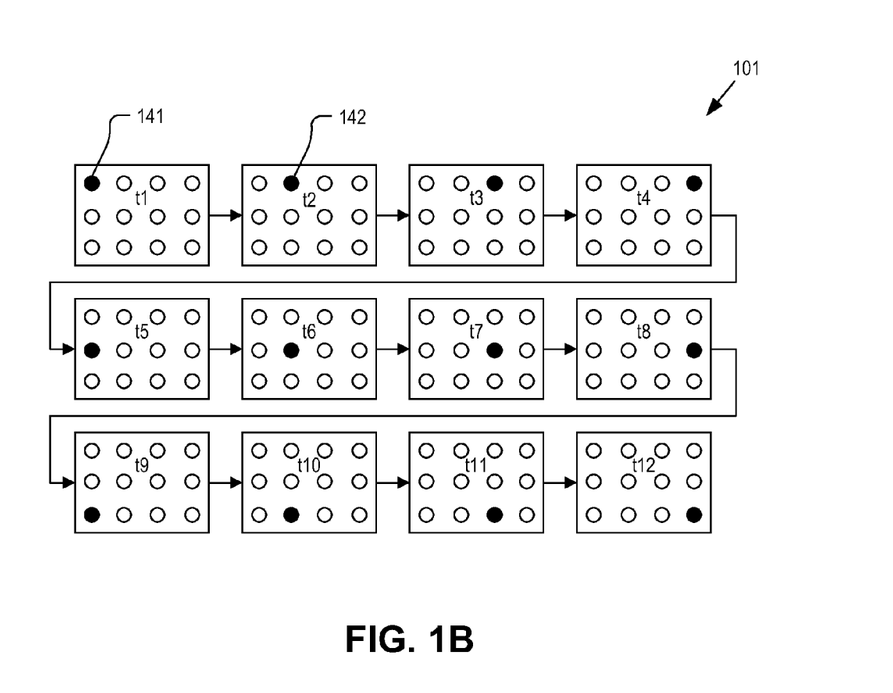
FIG. 1B illustrates a raster scan of an image where the overall image is projected one pixel at a time.

FIG. 1B illustrates a raster scan 101 of an image where the overall image is projected one pixel at a time. At time t1, image source 105 commences pixel-by-pixel scanning (raster scanning) of the image by projecting the first pixel 141 in the image. At time t2, the next pixel 142 is projected. The image is scanned left to right one line (or row) at a time until all pixels have been individually projected, at which time the image is updated with the next frame and pixel-by-pixel scanning starts over again. Raster scanning 101 projects the overall image to a single location. In other words, each pixel is projected to single location. This single location scanning along with physical constraints on optical system 100 tend to produce a relatively small eyebox 130.

Figure 2A:
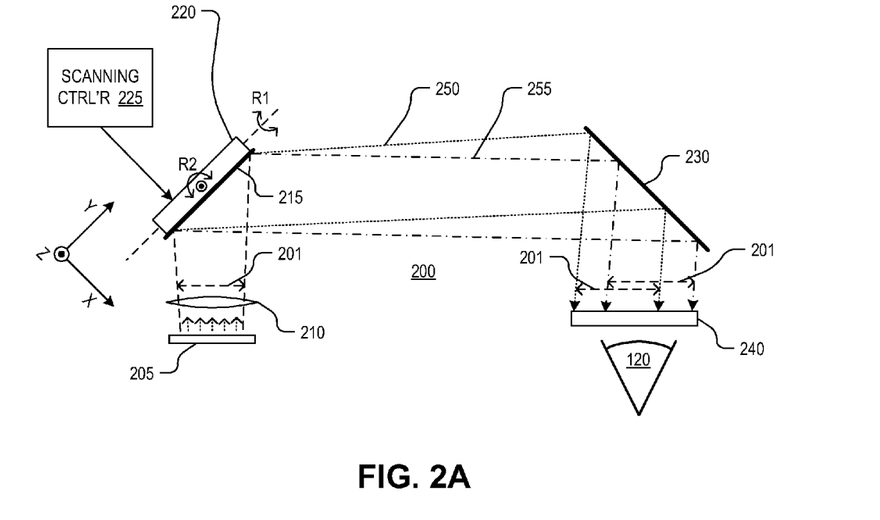
FIG. 2A is a block diagram illustrating an optical system that projects a whole image and uses a scanning mirror to extend an eyebox from which the image can be viewed, in accordance with an embodiment of the disclosure.

FIG. 2A is a block diagram illustrating an optical system 200 that projects a whole image 201 (see FIG. 2B) and uses a scanning mirror to extend an eyebox from which the image can be viewed, in accordance with an embodiment of the disclosure. The illustrated embodiment of optical system 200 includes an image source 205, a lens 210, a scanning mirror 215, an actuator 220, a scanning controller 225, and light bending optics 230.

Figure 2B:
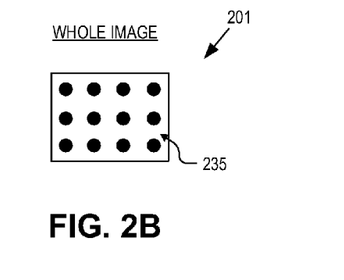
FIG. 2B illustrates a whole image where the two-dimensional array of image pixels representing a whole portion of the image are simultaneously projected, in accordance with an embodiment of the disclosure.

During operation, light source 205 generates whole image 201 by simultaneously projecting each pixel in a two-dimensional array of image pixels 235 that represent the whole portion of the image. Although FIG. 2B illustrates whole image 201 as a 4×3 pixel matrix, it should be appreciated that in practice whole image 201 may include a significantly larger pixel array (e.g. 320×240, 640×480, 1280×720, 1280× 1080 etc.). In contrast to the raster scanning 101 illustrated in FIG. 1B, all pixels within whole image 201 are simultaneously projected.

Whole image 201 is projected onto scanning mirror 215, which reflects whole image 201 towards (or into) light bending optics 230, which deliver whole image 201 to eye 120. Scanning mirror 215 is physically mounted to an actuator 220, which is controlled by scanning controller 225. Under control of scanning controller 225, whole image 201 can be scanned across the eye 120 via physically adjustments to the position of scanning mirror 215. Repetitiously scanning whole image 201 across multiple different locations results in an eyebox area 240 that is larger than the whole image 201 itself. This has the effect of increasing eyebox area 240 relative to the raster scanning technique illustrated in FIG. 1B. An increased eyebox area 240 relaxes the optical alignment constraints between eye bending optics 230 and the user's eye 120, leading to an overall improvement in the user experience.

Actuator 220 may be implemented using a variety of different electro-mechanical devices that can manipulate the position of scanning mirror 215 along one, two, or even three dimensions. For example, in one embodiment, actuator 220 is a micro-electro-mechanical system ("MEMS") scanner and scanning mirror 215 is a reflective surface (e.g., metallic coating) disposed on the MEMS scanner. In one embodiment, the MEMS scanner is repositionable in two independent axis. For example, the MEMS scanner may be capable of controlled movement in two translational axes (e.g., X and Y axes, X and Z axes, etc.), capable of controlled movement about two rotational axes (e.g., R1 and R2), or capable of controlled movement in both a translational axis and a rotational axis together. Adjustments to the position of scanning mirror 215 via actuator 220 under control of scanning controller 225 enables the whole image 201 output from image source 205 to be redirected along multiple optical paths (e.g., optical paths 250 and 255). By sequentially and repetitiously cycling through the different optical paths (e.g., cycling through the set of optical paths 30 or 60 times per second), eyebox area 240 is enlarged since the whole image 201 is viewable from a larger range of locations.

Figure 3A:
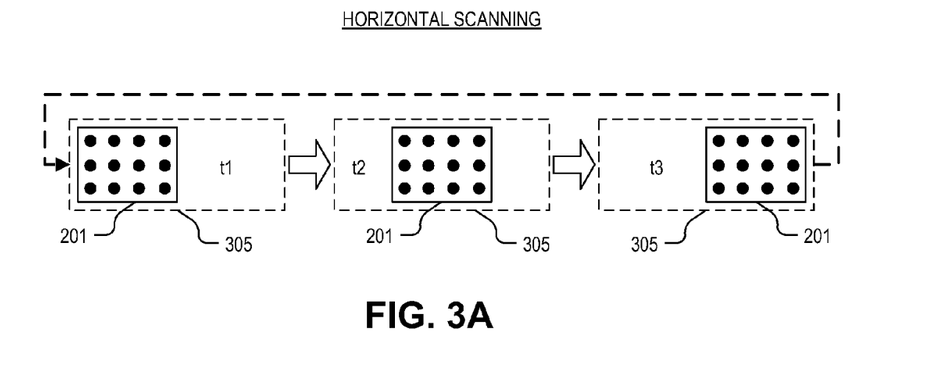
FIG. 3A illustrates a technique of horizontal whole image scanning to extend the eyebox area, in accordance with an embodiment of the disclosure.
Figure 3B:
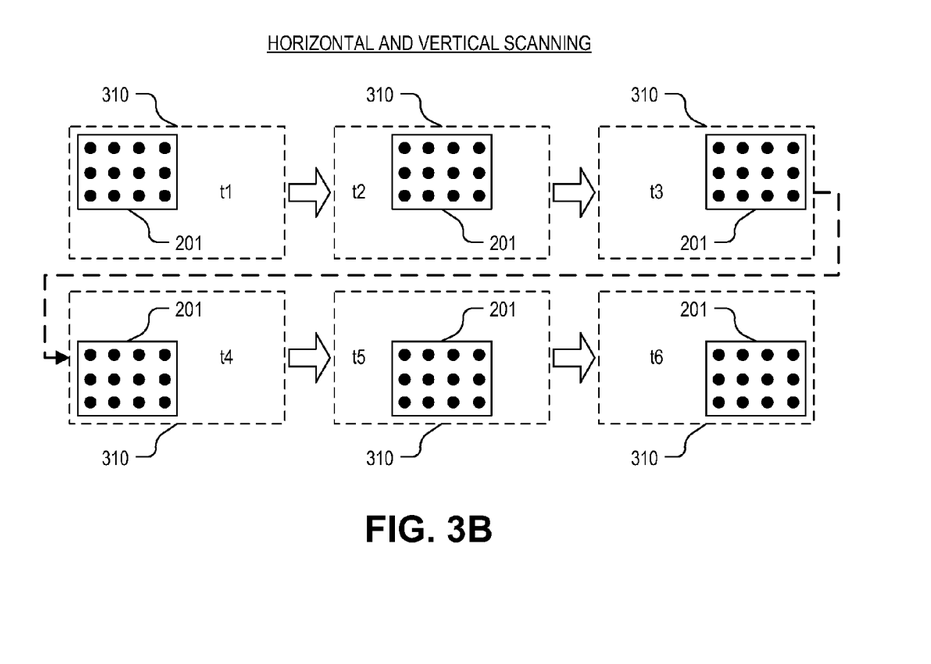
FIG. 3B illustrates a technique of two-dimensional whole image scanning to extend the eyebox area, in accordance with an embodiment of the disclosure.

FIGS. 3A and 3B illustrate two techniques of whole image scanning that may be achieved using optical system 200. FIG. 3A illustrates a technique of one-dimensional horizontal scanning to extend the eyebox horizontally, in accordance with an embodiment of the disclosure. Scanning controller 225 maybe include logic to manipulate scanning mirror 215 in a manner such that whole image 201 is sequentially and repetitiously moved along a horizontal path in front of eye 120. This horizontal scanning generates an eyebox area 305 that is extended or enlarged horizontally but remains unchanged vertically. In other words, the horizontal whole image scanning increases the lateral range from which eye 120 can view whole image 201. In one embodiment, eyebox area 305 has a horizontal width that is twice the horizontal width of whole image 201 without application of whole image scanning. Although FIG. 3A illustrates just three constituent positions of whole image 201 at times t1, t2, and t3 (and therefore correspondingly three positions of scanning mirror 215), it should be appreciated that in practice each scanning cycle may include a greater number of intermediate positions. For example, in one embodiment, each successive repositioning of whole image 201 may translate whole image 201 by an increment equal to a pixel pitch until the terminal position is reached (illustrated as the right most position) and then reset back to the initial position (illustrated as the left most position). In one embodiment, the scanning increment is equal to a pixel pitch of whole image 201 and the number of scanning positions is equal to the number of pixels in a row of whole image 201. Of course, other scanning increments and number of scanning positions may be used.

FIG. 3B illustrates a technique of two-dimensional scanning to enlarge the eyebox region 310 both horizontally and vertically, in accordance with an embodiment of the disclosure. Scanning controller 225 maybe include logic to manipulate scanning mirror 215 in a manner such that whole image 201 is sequentially and repetitiously moved along a horizontally and vertically changing path in front of eye 120. This horizontal and vertical scanning generates an eyebox area 310 that is extended or enlarged both horizontally and vertically. In other words, the lateral and vertical ranges from which eye 120 can view whole image 201 are both extended. In one embodiment, eyebox area 310 has a horizontal width that is twice the horizontal width of whole image 201 without application of whole image scanning and a vertical width that is 50% larger than the vertical width of whole image 201 without application of whole image scanning. Although FIG. 3B illustrates just three constituent horizontal positions and two vertical positions of whole image 201 at times t1-t6 (and therefore correspondingly six positions of scanning mirror 215), it should be appreciated that in practice each scanning cycle may include a greater number of intermediate horizontal and vertical positions. For example, in one embodiment, each successive repositioning of whole image 201 may translate whole image 201 by an increment equal to a pixel pitch until the terminal position is reached (illustrated as the right most position) and then reset back to the initial column position (illustrated as the left most position) on a subsequent row. In one embodiment, the horizontal scanning increment is equal to a horizontal pixel pitch of whole image 201, the vertical scanning increment is equal to a vertical pixel pitch of whole image 201, the number of horizontal scanning positions is equal to the number of pixels in a row of whole image 201, and the number of vertical scanning positions is equal to half the number of pixels in a column of whole image 201. Of course, other scanning increments and number of scanning positions may be used.

Returning to FIG. 2A, the illustrated embodiment of optical system 200 includes lens 210 to aid in a near-to-eye configuration by virtually displacing whole image 201 back from eye 120 so that it may be brought into focus. In one embodiment, lens 210 may collimate whole image 201 thereby placing the virtual image at infinity. However, in some configurations, lens 201 may be omitted. For example, in one embodiment, image source 205 outputs a collimated image. Image source 205 may be implemented with a variety of optical engines, such as an organic light emitting diode ("OLED") source, an active matrix liquid crystal display ("AMLCD") source, a laser source, a laser pico projector, or otherwise.

Light bending optics 230 are provided so that whole image 201 may be generated at a location peripheral to eye 120 (e.g., temple region of the user) and transported to a position in front of eye 120 for emission to eye 120 in a near-to-eye configuration. Light bending optics 230 may be implemented with a variety of different optical devices. The illustrated embodiment includes a simple reflective surface positioned in front of eye 120. In one embodiment, the reflective surface may be partially transparent so that external light from an external scene may be pass through to eye 120 and the whole image 201 (e.g., computer generated image) may be superimposed over the external scene thereby displaying an augmented reality to the user. In other embodiments, light bending optics 230 may include a variety of other structures including planar waveguides, light pipes, fused fiber bundles, partially reflective lenses, or otherwise.

Figure 4A:
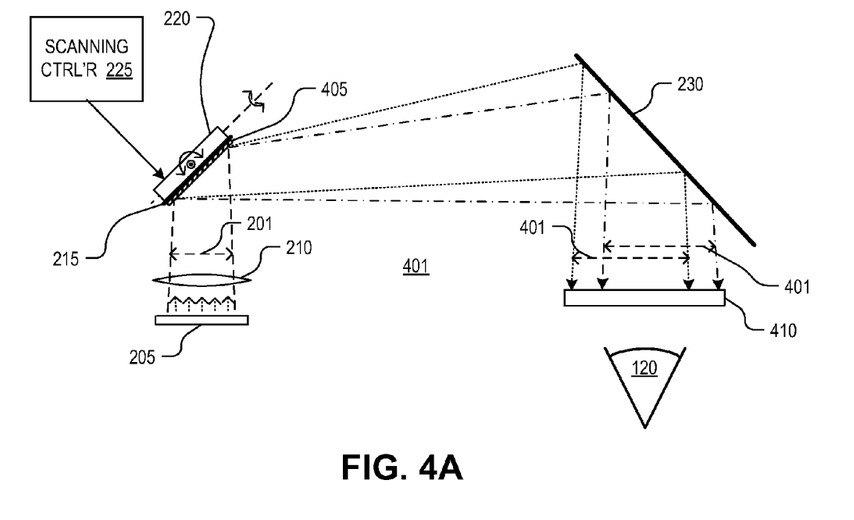
FIG. 4A is a block diagram illustrating an optical system that projects a whole image and uses a diffraction grating disposed on a scanning mirror to extend the eyebox, in accordance with an embodiment of the disclosure.

FIG. 4A is a block diagram illustrating an optical system 401 that uses whole image scanning and a diffraction grating to further extend the eyebox area, in accordance with an embodiment of the disclosure. Optical system 401 is similar to optical system 200 illustrated in FIG. 2A, except for the addition of diffraction grating 405 disposed on the surface of scanning mirror 215. Diffraction grating 405 can be configured to function as a spreading lens, which increases the divergence of the light (whole image 401) reflected off of scanning mirror 215, thereby increasing the size of whole image 401 projected onto eye 120 and increase eyebox area 410 relative to eyebox area 240. In other embodiments, diffraction grating 405 need not be disposed on scanning mirror 215, but rather may be disposed on a plate film positioned above the surface of scanning mirror 215.

Figure 4B:
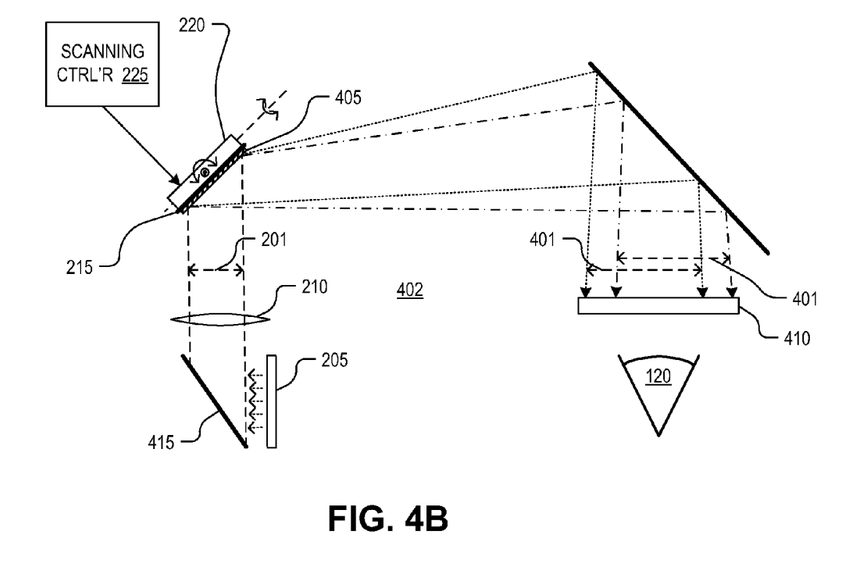
FIG. 4B is a block diagram illustrating an optical system that projects a whole image and includes an intermediate mirror positioned in the optical path between the image source and the scanning mirror, in accordance with an embodiment of the disclosure.

FIG. 4B is a block diagram illustrating an optical system 402 that uses whole image scanning and a diffraction grating to extend eyebox area 410 and includes an intermediate mirror 415 positioned in the optical path between image source 205 and scanning mirror 215, in accordance with an embodiment of the disclosure. Optical system 402 is similar to optical system 401, except for the addition of intermediate mirror 415 and new orientation for image source 205. Intermediate mirror 415 is oriented obliquely to image source 215 and scanning mirror 215 thereby allowing image source 215 to be rotated so that it need not directly face scanning mirror 215. This rotated configuration facilitates efficient and compact designs when used in a head mounted display. For example, intermediate mirror 415 and image source 215 may be combined into a single physical unit and mounted to eyeglass ear arms near the temple region of the user while scanning mirror 215 and actuator 220 may be positioned in the front corner of the eyeglasses where the ear arms engage the front lens or front eyeglass frame member (e.g., see FIG. 8).

Figure 5:
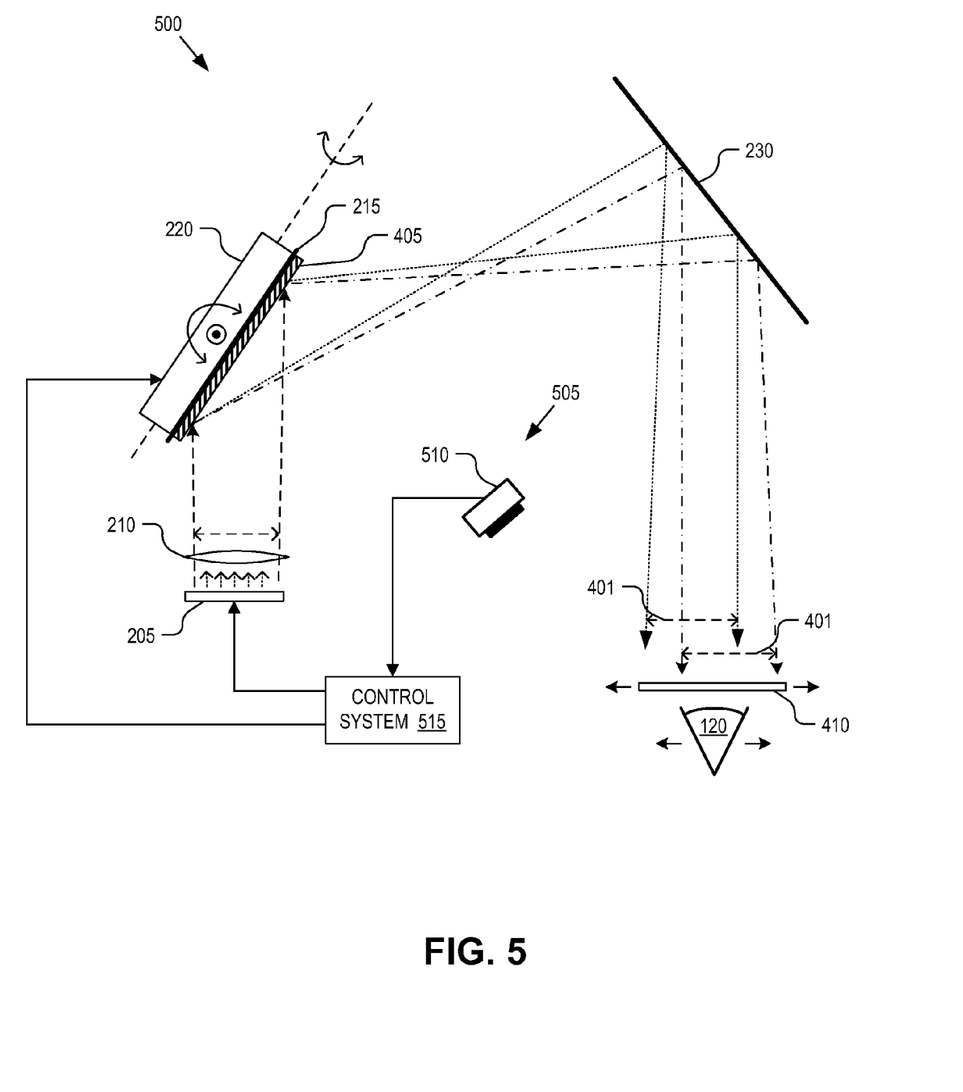
FIG. 5 is a block diagram illustrating an optical system that projects a whole image and uses real-time eye tracking in connection with a scanning mirror to extend an eyebox, in accordance with an embodiment of the disclosure.

FIG. 5 is a block diagram illustrating an optical system 500 that uses whole image scanning in connection with real-time eye tracking to extend an eyebox area, in accordance with an embodiment of the disclosure. The illustrated embodiment of optical system 500 includes image source 205, lens 210, scanning mirror 215, actuator 220, light bending optics 230, diffraction grating 405, and a gaze tracking system 505. The illustrated embodiment of gaze tracking system 505 includes a gaze tracking camera 510 and a control system 515.

Gaze tracking system 505 is provided to continuously monitor the movement of eye 120, to determine a gazing direction (e.g., location of the pupil) of eye 120 in real-time, and to provide feedback signals to actuator 220. The real-time feedback control can be used to dynamically adjust a bias position of scanning mirror 215 so that whole image 401 can be translated to track the movement of eye 120. In one embodiment, the feedback control can also be used to adjust a pre-distortion applied to image 201 to compensate for any dynamic image distortion that may occur due to positional changes of scanning mirror 215. Via appropriate feedback control, the central scanning position of whole image 401 can be made to move with eye 120 in a complementary manner to further increase the size of the eyebox 410 and/or the field of view of image 401 displayed to eye 120. For example, if eye 120 looks left, then image 401 may be shifted to the left to track the eye movement and remain in the user's central vision. Gaze tracking system 505 may also be configured to implement other various functions as well. For example, gaze tracking system 505 may be used to implement a user interface controlled by eye motions that enable to the user to select objects within their vision and issue other commands.

In one embodiment, gaze tracking camera 510 can be positioned to acquire a direct image of eye 120. In other embodiments, gaze tracking camera 510 can be positioned to acquire eye images via reflection from light bending optics 230.

Figure 6:
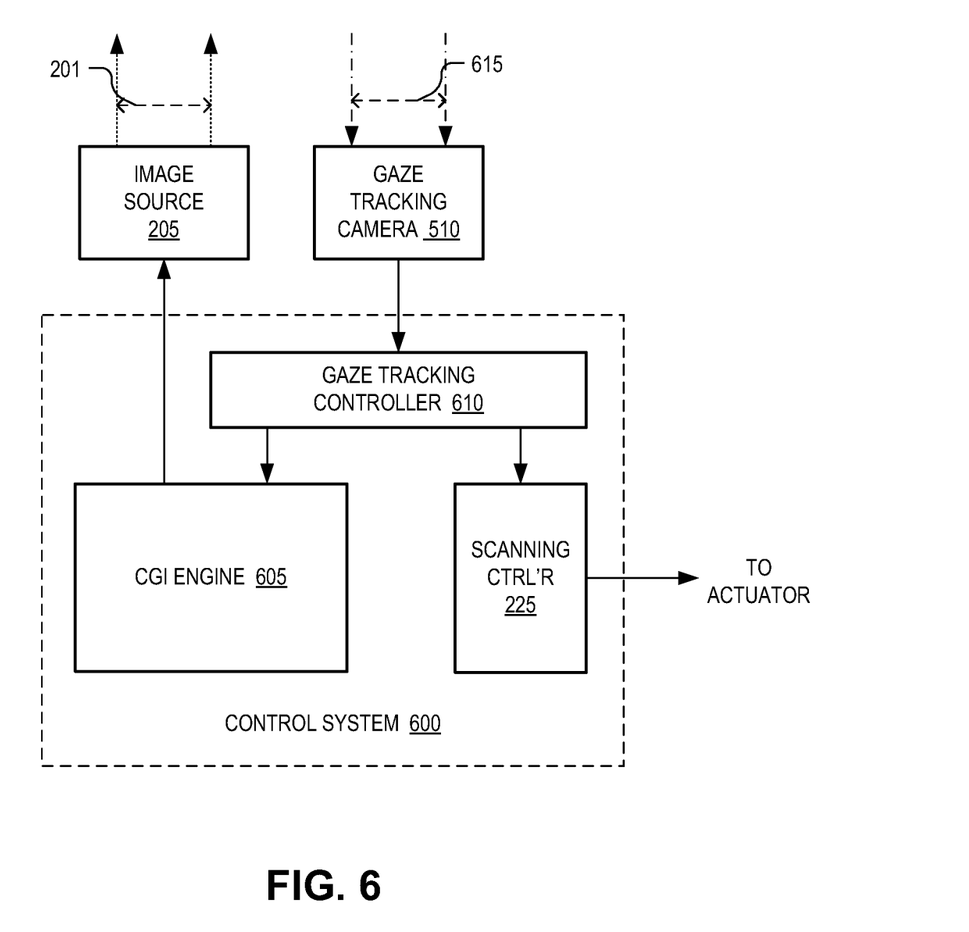
FIG. 6 is a functional block diagram illustrating a control system for controlling an optical system including eye tracking and whole image scanning, in accordance with an embodiment of the disclosure.

FIG. 6 is a functional block diagram illustrating a control system 600 for an optical system that uses whole image scanning in connection with real-time eye tracking, in accordance with an embodiment of the disclosure. Control system 600 represents one possible implementation of control system 505 illustrated in FIG. 5. The illustrated embodiment of control system 600 includes a computer generated image ("CGI") engine 605, a gaze tracking controller 610, and scanning controller 225. The functionality provide by control system 600, and its individual components, may be implemented entirely in hardware (e.g., application specific integrated circuit, field programmable gate array, etc.), entirely in firmware/software executing on a general purpose processor, or a combination of both.

Figure 7:
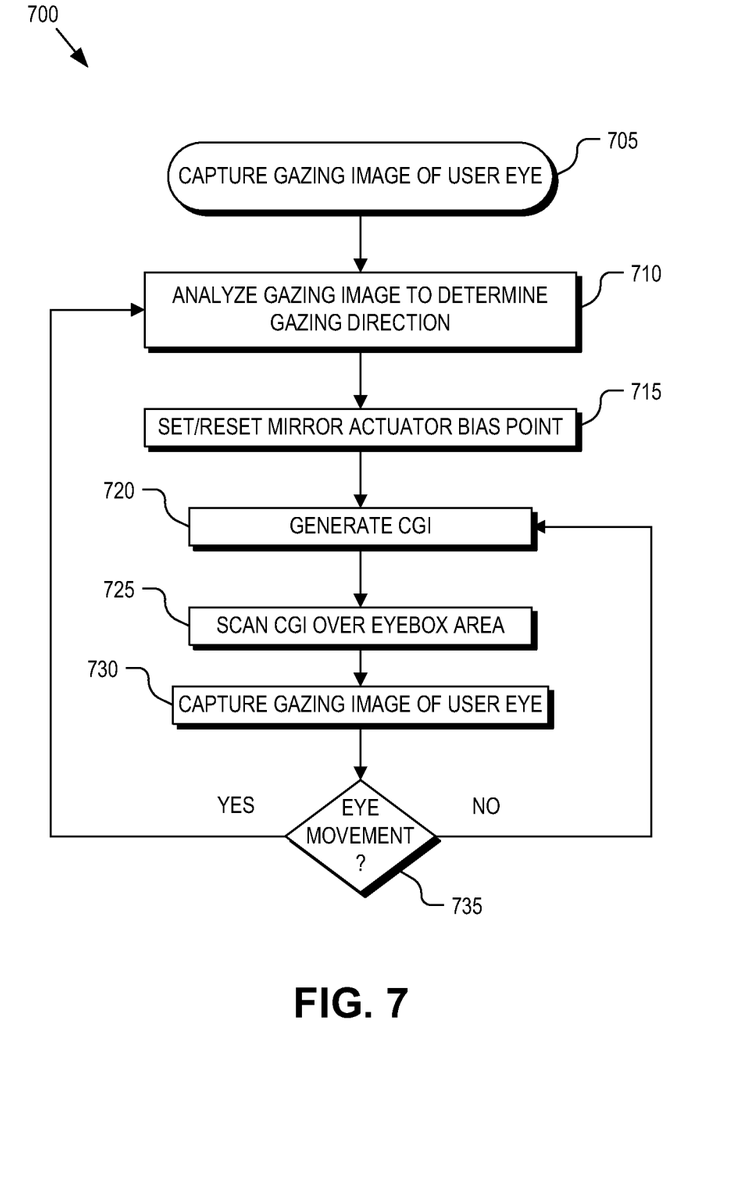
FIG. 7 is a flow chart illustrating a process for generating a near-to-eye display using whole image scanning and eye tracking, in accordance with an embodiment of the disclosure.

FIG. 7 is a flow chart illustrating a process 700 of operation of control system 600, in accordance with an embodiment of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated or even in parallel.

In a process block 705, gaze tracking camera 510 captures gazing image 615 of eye 120. Gazing image 615 may be acquired as a direct image or a reflection off of one or more reflective surfaces. A new gazing image 615 may be continually acquired as a video stream of images. In a process block 710, gazing image 615 is analyzed by gaze tracking controller 610 to determine the current gazing direction of eye 120. The gazing direction may be determined based upon the location of the pupil within the gazing image 615. With the real-time gazing direction determined, gaze tracking controller 610 can provide feedback control signals to scanning controller 225 to adjust the bias point of actuator 220 and scanning mirror 215 in real-time (process block 715). The bias point is a position about which scanning mirror 215 is repetitiously adjusted; however, the bias point can be any position in the repetitious cycle of motion and need not be a center position. In one embodiment, gaze tracking controller 610 may further provide a feedback control signal to CGI engine 605 to facilitate real-time pre-distortion correction to compensate for any image distortion that may occur from scanning mirror 215, diffractive lens 405, or light bending optics 230. Real-time adjustments to scanning mirror 215 may cause dynamically changing optical distortion. Accordingly, the feedback control signal to CGI engine 605 may be used to impart compensating pre-distortion. Pre-distortion may include applying various types of complementary optical correction effects such as keystone, barrel, and pincushion.

In a process block 720, the CGI is generated by CGI engine 605 and output from image source 205 as whole image 201. In a process block 725, scanning controller 225 instructs actuator 220 to commence repetitious scanning of whole image 201 across eye 120 about the bias point set in process block 715. In a process block 730, a new gazing image is captured of eye 120 and used to determine whether eye 120 has changed its gaze. If eye movement is detected (decision block 735), then process 700 returns to process block 710 and continues from there. Each time eye 120 moves, the gazing direction is determined and a new bias point is selected based upon the gazing direction. The whole image is then repetitiously scanned about the bias point.

Figure 8:
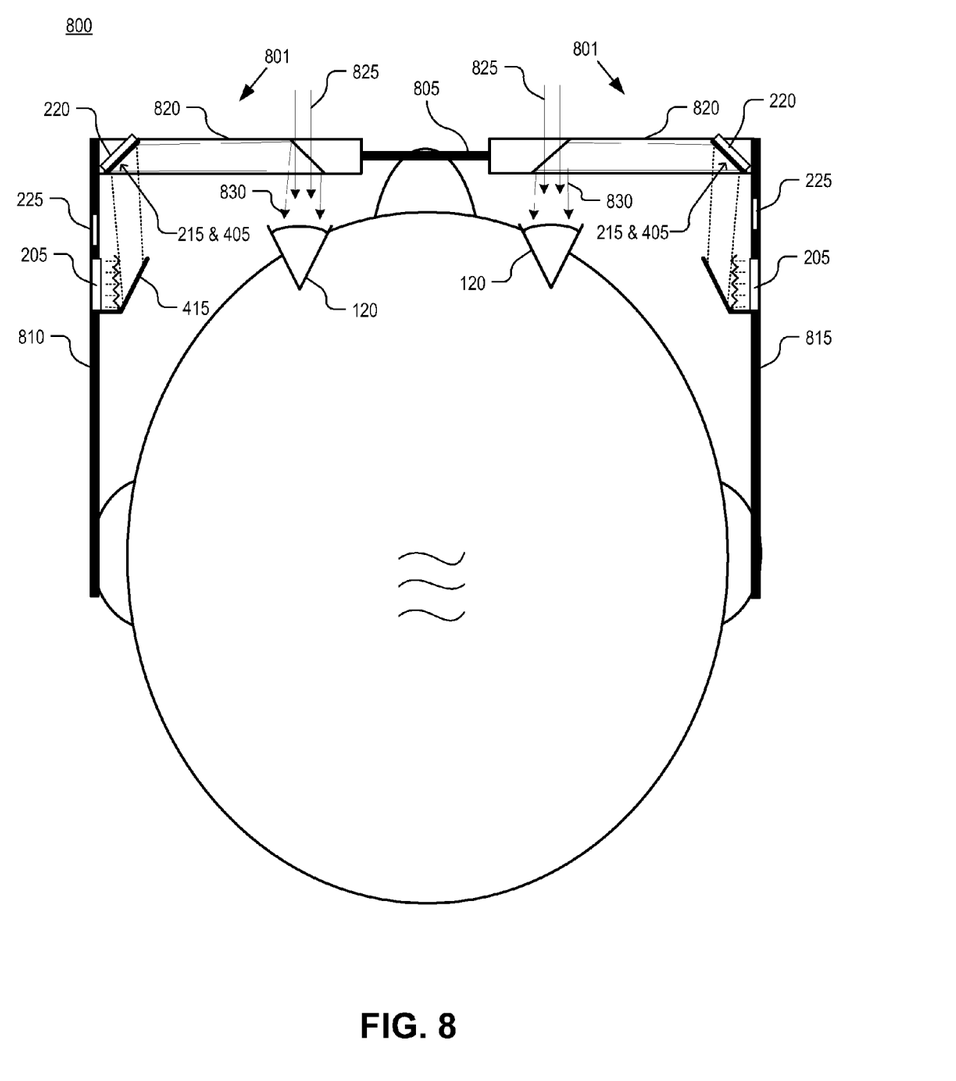
FIG. 8 is a top view of a head mounted display using a pair of whole image scanning display devices, in accordance with an embodiment of the disclosure.

FIG. 8 is a top view of a head mounted display ("HMD") 800 using a pair of near-to-eye optical systems 801, in accordance with an embodiment of the disclosure. Each near-to-eye optical system 801 may be implemented with optical system 200, optical system 401, optical system 402, optical system 500, or various combinations thereof. The near-to-eye optical systems 801 are mounted to a frame assembly, which includes a nose bridge 805, left ear arm 810, and right ear arm 815. The illustrated embodiments of near-to-eye optical systems 801 each include image source 205, intermediate mirror 415, actuator 220, scanning mirror 215, diffractive lens 405, scanning controller 225, and light bending optics 820.

In the illustrated embodiment, light bending optics 820 include a light pipe or housing in which scanning mirror 215 and a partially transparent redirecting mirror are embedded. Whole image 201 is directed onto the partially transparent mirror disposed in front of eye 120 where whole image 201 exits towards eye 120. Although the illustrated embodiment of HMD 800 includes light pipes for implementing the light bending optics, it should be appreciated that embodiments are not limited in this regard. Rather a variety of different light bending optics including free space air and a redirecting mirror may be used. Furthermore, although FIG. 8 illustrates a binocular embodiment, HMD 800 may also be implemented as a monocular embodiment.

The two near-to-eye optical systems 801 are secured into an eye glass arrangement that can be worn on the head of a user. The left and right ear arms 810 and 815 rest over the user's ears while nose assembly 805 rests over the user's nose. The frame assembly is shaped and sized to position an emission surface of light bending optics 820 in front of a corresponding eye 120 of the user. Of course, other frame assemblies may be used (e.g., single, contiguous visor for both eyes, integrated headband or goggles type eyewear, etc.).

The illustrated embodiment of HMD 800 is capable of displaying an augmented reality to the user. Light bending optics 820 permit the user to see a real world image via external scene light 825. Left and right (binocular embodiment) CGIs 830 may be generated by one or two CGI engines (not illustrated) coupled to a respective light sources 205. CGIs 830 are seen by the user as virtual images superimposed over the real world as an augmented reality. In some embodiments, external scene light 825 may be blocked or selectively blocked to provide a head mounted virtual reality display.

The processes explained above are described in terms of computer software and hardware. The techniques described may constitute machine-executable instructions embodied within a tangible machine (e.g., computer) readable storage medium, that when executed by a machine will cause the machine to perform the operations described. Additionally, the processes may be embodied within hardware, such as an application specific integrated circuit ("ASIC") or the like.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An image display apparatus, comprising:
    an image source to output a whole image by simultaneously projecting a two-dimensional array of image pixels representing the whole image, wherein the image pixels of the two-dimensional array of image pixels are emitted from the image source at a given instant to illuminate the whole image at the given instant;
    a scanning mirror positioned in an optical path of the whole image output from the image source to reflect the whole image;
    an actuator coupled to the scanning minor to selectively adjust the scanning minor about at least one axis; and
    a scanning controller coupled to the actuator to control a position of the scanning minor about the at least one axis, wherein the scanning controller includes logic to repetitiously adjust the position of the scanning mirror to cause the whole image to be scanned over an eyebox area that is larger than the whole image.

2. The image display apparatus of claim 1, wherein the logic of the scanning controller is coupled to the actuator to scan the whole image horizontally to enlarge a horizontal dimension of the eyebox area from which the whole image may be viewed.

3. The image display apparatus of claim 2, wherein the actuator is coupled to selectively adjust the scanning minor about two axes, wherein the logic of the scanning controller is further coupled to the actuator to scan the whole image both horizontally and vertically to enlarge the horizontal dimension and a vertical dimension of the eyebox area from which the whole image may be viewed.

4. The image display apparatus of claim 1, wherein the actuator comprises a micro-electro-mechanical system ("MEMS") scanner and the scanning minor comprises a reflective surface disposed on the MEMS scanner.

5. The image display apparatus of claim 4, further comprising:
  a diffractive lens disposed over the reflective surface on the MEMS scanner, the diffractive lens configured to increase a divergence of light rays of the whole image to spread the whole image.

6. The image display apparatus of claim 1, wherein the optical apparatus comprises a head mounted display that when worn by a user positions the image source and the scanning mirror in peripheral locations to an eye of the user, the optical apparatus further comprising:
  light bending optics positioned in the optical path between the scanning mirror and the eye of the user to transport the whole image to be in front of the eye.

7. The image display apparatus of claim 6, further comprising:
  a intermediate mirror positioned in the optical path between the image source and the scanning mirror and orientated obliquely to an emission aperture of the image source to redirect the whole image projected from the image source onto the scanning minor, wherein the image source and the intermediate minor are positioned in a temple region of the head mounted display while the scanning mirror and actuator are positioned at a forward eyeglass corner of the head mounted display.

8. The image display apparatus of claim 6, further comprising:
  a gaze tracking camera optically aligned to capture real-time eye images of the eye when the optical apparatus is worn by the user; and
  a gaze tracking controller coupled to receive the eye images from the gaze tracking camera, coupled to analyze the eye images to determine a gazing direction, and coupled to the scanning controller to provide a feedback control signal to the scanning controller to dynamically adjust a bias position of the actuator based upon the gazing direction of the eye.

9. The image display apparatus of claim 8, wherein a location of the eyebox within which the whole image is scanned is selected based upon the bias position determined based upon the gazing direction of the eye.

10. A head mounted display ("HMD") for displaying a whole image to a user, the head mounted display comprising:
  a near-to-eye optical system including:
    an image source to output the whole image by simultaneously projecting a two-dimensional array of image pixels representing the whole image, wherein the image pixels of the two-dimensional array of image pixels are emitted from the image source at a given instant to illuminate the whole image at the given instant;
    a scanning mirror positioned in an optical path of the whole image output from the image source to reflect the whole image;
    an actuator coupled to the scanning mirror to selectively adjust the scanning mirror about at least one axis; and
    a scanning controller coupled to the actuator to control a position of the scanning mirror about the at least one axis, wherein the scanning controller includes logic to continuously and repetitiously adjust the position of the scanning mirror to cause the whole image to be scanned over an eyebox area that is larger than the whole image; and
  a frame assembly to support the near-to-eye optical system for wearing on a head of the user.

11. The HMD of claim 10, wherein the actuator comprises a micro-electro-mechanical system ("MEMS") scanner and the scanning mirror comprises a reflective surface disposed on the MEMS scanner.

12. The HMD of claim 11, wherein the near-to-eye optical system further comprises:
  a diffractive lens disposed over the reflective surface on the MEMS scanner, the diffractive lens configured to increase a divergence of light rays of the whole image to spread the whole image.

13. The HMD of claim 10, wherein the frame assembly mounts the image source and the scanning minor in peripheral locations to an eye of the user, the HMD further comprising:
  light bending optics positioned in the optical path between the scanning mirror and the eye of the user to transport the whole image to be in front of the eye.

14. The HMD of claim 13, wherein the near-to-eye optical system further comprises:
  a intermediate mirror positioned in the optical path between the image source and the scanning mirror and orientated obliquely to an emission aperture of the image source to redirect the whole image projected from the image source onto the scanning minor, wherein the image source and the intermediate minor are mounted to the frame assembly in a temple region of the HMD while the scanning mirror and actuator are mounted at a forward eyeglass corner of the HMD.

15. The HMD of claim 10, further comprising:
  a gaze tracking camera optically aligned to capture real-time eye images of the eye when the HMD is worn by the user; and
  a gaze tracking controller coupled to receive the eye images from the gaze tracking camera, coupled to analyze the eye images to determine a gazing direction, and coupled to the scanning controller to provide a feedback control signal to the scanning controller to dynamically adjust a bias position of the actuator based upon the gazing direction of the eye.

16. A method of displaying a whole image with a head mounted display, the method comprising:
  simultaneously projecting a two-dimensional array of image pixels representing the whole image from an image source, wherein the image pixels of the two-dimensional array of image pixels are projected from the image source at a given instant to illuminate the whole image at the given instant, the image source positioned at a peripheral location to an eye of a user;
  transporting the whole image from the peripheral location to be in front of the eye with a light optics apparatus;
  contemporaneously reflecting the whole image with a minor positioned within an optical path of the whole image;
  repetitiously actuating the mirror to redirect the whole image along different optical paths; and
  scanning the whole image over an eyebox area that is larger than the whole image as a consequence of actuating the mirror.

17. The method of claim 16, wherein scanning the whole image over the eyebox area comprises scanning the whole image horizontally across the eye of the user to enlarge a horizontal dimension of the eyebox area.

18. The method of claim 17, wherein scanning the whole image over the eyebox area comprises scanning the whole image both horizontally and vertically across the eye of the user to enlarge the horizontal dimension and a vertical dimension of the eyebox area, wherein the minor is actuated in at least two dimensions.

19. The method of claim 16, further comprising:
diffracting the whole image to increase a divergence of the whole image and increase the eyebox area from which the whole image may be viewed, wherein the diffracting is executed by a diffraction grating disposed on a surface of the mirror.

20. The method of claim 16, further comprising:
capturing a gazing image of the user eye while displaying the whole image to the eye;
analyzing the gazing image to determine a gazing direction in real-time while displaying the whole image to the eye; and
adjusting a bias position of the mirror through which the repetitious actuating oscillates in response to the determined gazing direction to track eye movement with the whole image.

21. A head mounted display ("HMD") for displaying an image to a user, the head mounted display comprising:
a near-to-eye optical system including:
an image source to output the image by simultaneously projecting a two-dimensional array of image pixels representing a whole portion of the image;
a scanning mirror positioned in an optical path of the image output from the image source to reflect the image;
an actuator coupled to the scanning minor to selectively adjust the scanning mirror about at least one axis;
a scanning controller coupled to the actuator to control a position of the scanning mirror about the at least one axis, wherein the scanning controller includes logic to continuously and repetitiously adjust the position of the scanning minor to cause the image to be scanned over an eyebox area that is larger than the whole portion of the image; and
an intermediate mirror positioned in the optical path between the image source and the scanning mirror and orientated obliquely to an emission aperture of the image source to redirect the image projected from the image source onto the scanning minor, wherein the image source and the intermediate minor are mounted to the frame assembly in a temple region of the HMD while the scanning mirror and actuator are mounted at a forward eyeglass corner of the HMD; and
a frame assembly to support the near-to-eye optical system for wearing on a head of the user.

* * * * *